July 10, 1956 L. C. CHOUINGS 2,753,956
BRAKE SHOE SPREADING DEVICES
Filed Feb. 8, 1951 2 Sheets-Sheet 1

INVENTOR
Leslie C. Chouings
BY
Chas. M. Funkhouser
ATTORNEY

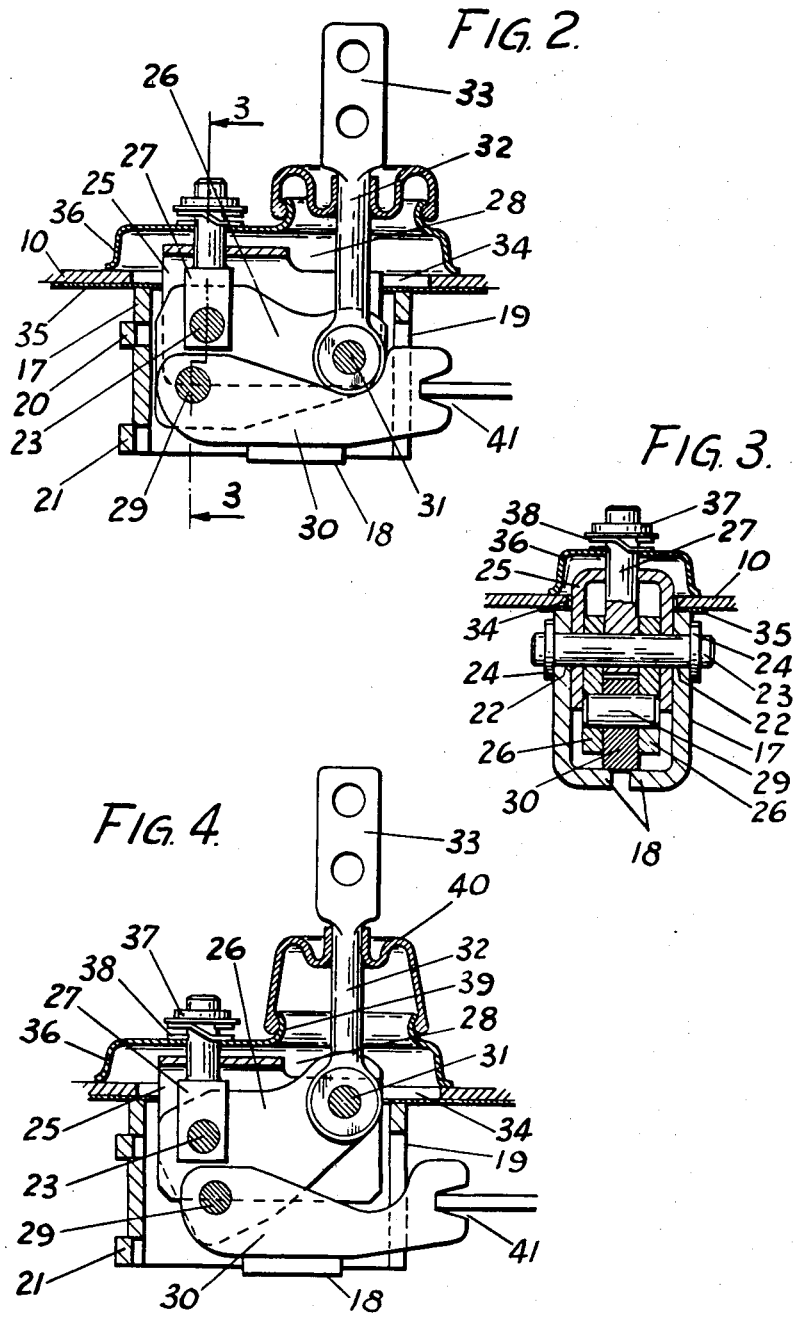

United States Patent Office 2,753,956
Patented July 10, 1956

2,753,956

BRAKE SHOE SPREADING DEVICES

Leslie Cyril Chouings, Leamington Spa, Warwickshire, England, assignor to Automotive Products Company Limited, Leamington Spa, England, a British company Application February 8, 1951, Serial No. 210,004

5 Claims. (Cl. 188—78)

The invention relates to brakes and more particularly to a brake shoe spreading device, having a brake applying connection acting in a plane perpendicular to the plane in which the brake shoes move, and located between adjacent ends of two shoes to displace either or both of the said ends outwardly and thus bring the shoes into engagement with a rotating drum.

One object of the invention is to provide a brake shoe spreading device including a lever, pivotally mounted in a housing movable with respect to the brake shoe support, and operatively connected to one brake shoe, the second brake shoe being operatively connected to the housing to be actuated by the reaction transmitted in operation by said housing.

Another object of the invention is to provide a spreading device including a bell crank lever pivotally mounted in a housing slidably mounted on the brake shoe support and having one arm having an operating connection acting at right angles to the said support and a second arm operatively connected to one brake shoe, the arrangement being such that when the bell crank lever is turned about its pivot to apply a thrust to one brake shoe, a reaction is transmitted through the housing to the second brake shoe.

A still other object of the invention is to provide a brake shoe spreading device comprising a housing slidably mounted with respect to the brake shoe support and having two spaced parallel members, and a bell crank lever pivotally mounted between said side members for movement in a plane parallel to the latter and associated with a shoe operating thrust member also mounted between said side members.

Other objects and advantages of the invention will appear from the following description and the annexed drawings in which:

Figure 2 is a sectional plan of the spreading device on the line 2—2 of Figure 1;

Figure 3 is a section of the spreading device taken on the line 3—3 of Figure 2; and Figure 4 is a section similar to Figure 2, but showing the parts in the positions to which they move when the brake is applied.

Figure 1:
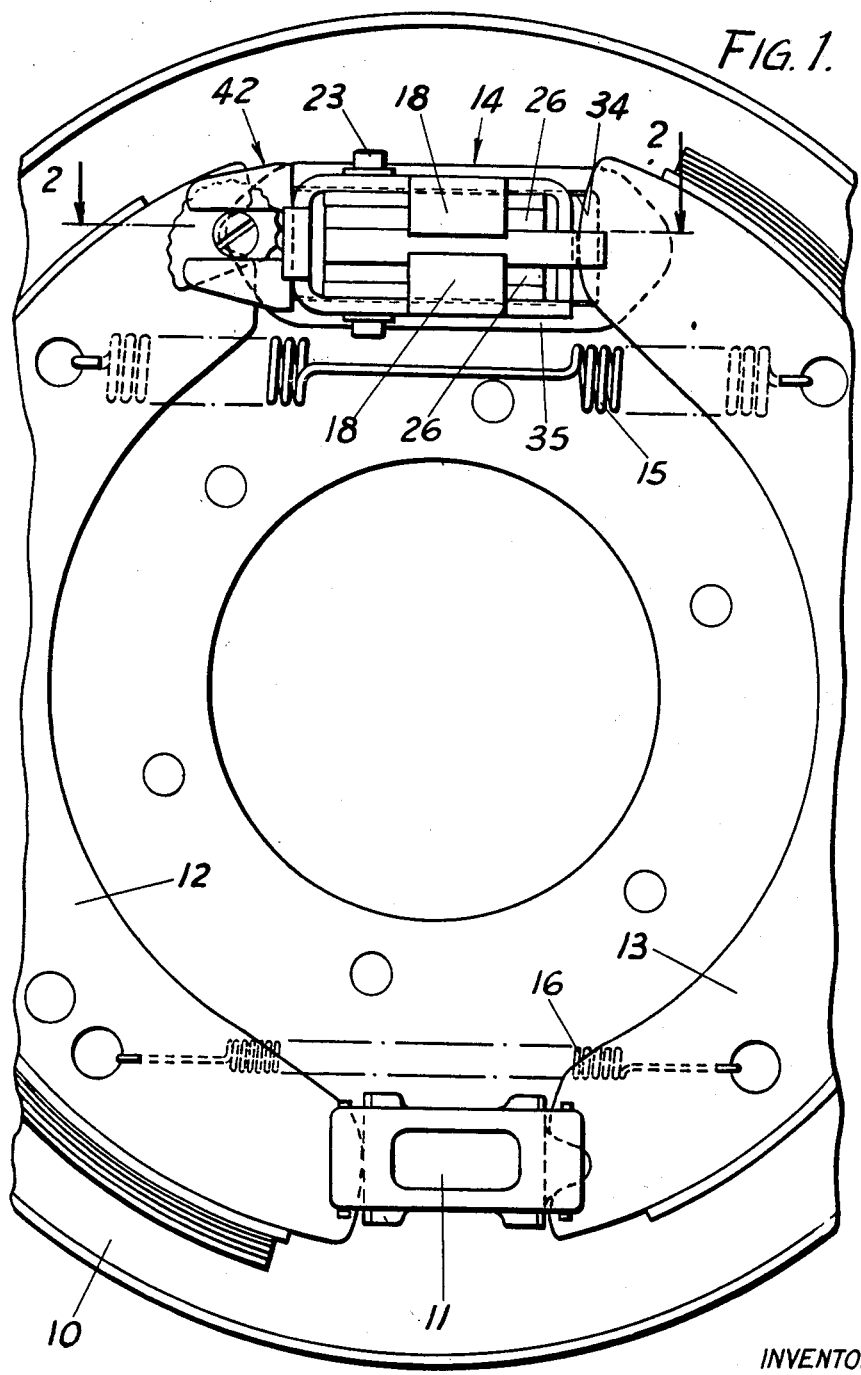
Figure 1 is a front elevation of a brake assembly incorporating one form of spreading device according to the present invention.

Referring to the drawings, the brake comprises the usual back-plate 10 having an abutment 11 for one pair of adjacent ends of a pair of brake shoes 12 and 13, and spreading device, generally indicated at 14, mounted between the other pair of adjacent ends of the shoes 12 and 13, the shoes being urged inwardly against the abutment and the spreading device by pull-off springs 15, 16 extending from one shoe to the other.

The spreading device includes a housing 17 pressed from sheet metal and slidably mounted on the back-plate 10, the housing consisting of a strip of metal bent transversely through a right angle at each of three points along its length to form the upper and lower walls, and the end walls, of a rectangular box-like structure, the ends of the strip meeting at the fourth corner of the housing.

A pair of lugs 18, 18 projecting from the upper and lower walls of the housing are bent over towards each other, as shown, and one end of the housing is slotted as shown at 19 in Figures 2 and 4. Portions 20, 21 of the other end of the housing are punched outwardly as shown in Figures 2 and 4, for a purpose which will be described below.

Aligned holes 22, 22 in the upper and lower walls of the housing receive a pin 23 held in place by spring clips 24, 24 fitting in grooves in the pin. The pin 23 also passes through the sides of a channel-shaped member 25 formed by bending a piece of sheet metal and fitted into the housing, the base of the channel-shaped member projecting through the open side of the housing opposite to that at which the lugs 18, 18 are located. Between the limbs of the member 25 are located two flat metal plates 26, 26, and between the plates 26, 26 is located a link 27, the pin 23 passing through all of these parts. The link 27 passes through a hole in the base of the channel-shaped member adjacent one end of the latter, and the said member is slotted from its other end for about half its length as shown at 28.

A pivot pin 29 mounted in aligned holes in the plates 26, 26 supports, between the said plates, one end of a thrust member 30 which projects at its other end through the slot 19 in the housing, and rests against the lugs 18, 18. Another pivot pin 31 located in a further pair of aligned holes in the plates 26, 26 passes between the plates, through an eye formed on the end of a connector 32 adapted for connection at 33 to a pull rod of a brake operating linkage.

The back-plate 10 is slotted as at 34, the width of the slot being such that the member 25 is a sliding fit in it, and the housing is positioned with its open side through which the member 25 projects bearing against a thin metal plate 35 lying against the inner side of the back-plate, and with the link 27 and connector 32 passing through the slot 34. A pressed sheet metal cover 36 covers the slot 34 on the outer side, the link 27 passing through this cover and being grooved at its outer end to receive a spring clip 37 serving as an abutment for a spring washer 38 which bears on the outer side of the cover 36. The spring washer 38, acting through the link 27, thus urges both the housing 17 and the cover 36 against the back-plate, and retains both in position. The connector 32 passes through an opening 39 in the cover 36, a flexible dust shield 40 being provided to close the opening 39.

It will be seen that the pin 23 and the pivot pins 29 and 31 lie at the three corners of a triangle, so that the plates 26, 26 constitute, in effect, a bell crank lever, and a pull, substantially perpendicular to the back-plate, on the connector 32 rocks the plates about the pin 23 to produce movement of the thrust member 30 in a direction lengthwise of the housing, the parts moving from the position shown in Figure 2 towards that shown in Figure 4.

The thrust member 30 is notched at its outer end as shown at 41 in Figures 2 and 4 to receive the end of the web of the shoe 13, and the punched-out portions 20, 21 of the housing locate between them one part of an adjuster, generally indicated by the reference 42, for taking up wear of the shoe linings. The adjuster, which is located between the housing and the shoe 12, is of the form described in Gates U. S. application Ser. No. 632,-645 filed on December 4, 1945, now Patent No. 2,562,-354.

It will be seen that a pull applied to the connector 32 will rock the plates 26, 26, and apply a thrust to the thrust member 30 which will urge the shoe 13 outwardly, the reaction being transmitted through the pin 23, the housing 17 and the adjuster 42, to the shoe 12, so that both shoes are urged outwardly against the surrounding drum, which is not shown in the drawings. A rectilinear movement is assigned in operation to the housing 17 by the channel-shaped member 25 extending through slot 34.

The brake is preferably so disposed that the shoe 13 is the leading shoe during rotation of the brake drum in the normal direction, the adjuster 42 therefore acting on the other shoe, and the fact that the housing 17 is slidable on the back-plate enables this one adjuster to adjust both shoes.

It will be seen that the invention provides a simple form of brake shoe spreading device which is compact and contains very few parts.

It will be understood that by suitable rearrangement of the relative positions of the pivots on the bell-crank lever, the spreading device may be adapted for operation by a thrust instead of by a pull.

Having now described my invention, what I claim is:

1. A brake shoe spreading device comprising a movable housing, two spaced parallel side members forming part of the housing, two spaced metal plates parallel to said side members and forming a bell crank lever, a brake applying member connected to the bell crank lever, aligned openings in said side members and plates, a pin extending through said openings to form a pivot about which the bell crank lever turns in operation, and a shoe operating thrust member also mounted between said side members and pivotally connected to the bell crank lever.

2. A brake shoe spreading device according to claim 1 comprising a sheet of metal bent to form a housing of box-like structure and provided with projections acting as a guide for the thrust member connected to the bell crank lever.

3. A brake shoe spreading device comprising a brake shoe support, a housing movable with respect to the brake shoe support, two brake shoes mounted on the support, a lever pivotally mounted in the housing, an operating connection between the lever and one brake shoe, an operating connection between the housing and a second brake shoe, and means for holding the housing in engagement with the brake shoe support, said means comprising a cover plate, a slot in the cover plate, a link pivotally connected at one end thereof to said lever and extending through the slot, an abutment on the opposite end of the said link, and a resilient member positioned between the cover plate and the said abutment.

4. A brake comprising a pair of brake shoes, a brake shoe support, a brake shoe spreading device including a housing which is movable with respect to the brake shoe support and in which is located a portion of the brake shoe spreading device, a thrust member between the spreading device and one brake shoe adapted for sliding movement in said housing, an operating connection between the housing and the second brake shoe, a slot in the brake shoe support, and a member connected to the housing and extending through said slot, said member and slot having a shape assigning a rectilinear movement to the housing upon actuation of the shoe spreading device.

5. A brake comprising a pair of brake shoes, a brake shoe support, a brake shoe spreading device connected to the two shoes, a lever forming part of the spreading device, an applying linkage connected to said lever and acting at right angles to the brake shoe support, a housing in which is located a portion of the spreading device, two parallel side members forming the housing and having aligned openings therein, a channel-shaped member having two limbs parallel to the side members, channel-shaped member and lever, a pin extending through said openings and on which is pivoted said lever, a flat-side slot in the brake shoe support, the channel-shaped member extending through said slot, a thrust member connecting said lever to one of the brake shoes, and an operating connection between said housing and the other shoe.

References Cited in the file of this patent

UNITED STATES PATENTS

| 1,928,750 | Apple et al. | Oct. 3, 1933 |
| 2,252,860 | Porsche | Aug. 19, 1941 |
| 2,469,826 | Irving | May 10, 1949 |

FOREIGN PATENTS

| 668,869 | Great Britain | 1952 |